(12) United States Patent
Kitson et al.

(10) Patent No.: US 7,407,603 B2
(45) Date of Patent: Aug. 5, 2008

(54) LIQUID CRYSTAL DEVICE, COMPOSITIONS AND METHOD OF MANUFACTURE

(75) Inventors: Stephen Christopher Kitson, Alveston (GB); Neil Carter, Kirkby-in-Cleveland (GB); Michael Bernard Cinderey, Middlesbrough (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/476,580

(22) PCT Filed: Nov. 19, 2002

(86) PCT No.: PCT/GB02/05186

§ 371 (c)(1),
(2), (4) Date: May 21, 2004

(87) PCT Pub. No.: WO03/046110

PCT Pub. Date: Jun. 5, 2003

(65) Prior Publication Data

US 2004/0185185 A1    Sep. 23, 2004

(30) Foreign Application Priority Data

Nov. 20, 2001    (GB) ................ 0127728.4

(51) Int. Cl.
*C09K 19/00* (2006.01)
*C09K 19/52* (2006.01)

(52) U.S. Cl. ............... 252/299.01; 252/299.1; 430/20; 430/270.1; 430/964; 428/1.1; 349/123; 349/129; 349/139; 349/140

(58) Field of Classification Search ............ 430/270.1, 430/964, 20; 349/123, 129, 139–140; 252/299.01, 252/299.1; 428/1.1
See application file for complete search history.

(56) References Cited

U.S. PATENT DOCUMENTS

| 3,843,233 | A | | 10/1974 | Haas et al. | |
|---|---|---|---|---|---|
| 4,577,930 | A | | 3/1986 | Yang | |
| 5,585,035 | A | * | 12/1996 | Nerad et al. | 252/299.01 |
| 5,593,615 | A | * | 1/1997 | Nerad et al. | 252/299.01 |
| 5,641,426 | A | * | 6/1997 | Nerad et al. | 252/299.01 |
| 6,913,798 | B2 | * | 7/2005 | Kitamura et al. | 428/1.53 |
| 2005/0270461 | A1 | * | 12/2005 | Kitson et al. | 349/128 |

FOREIGN PATENT DOCUMENTS

| EP | 1 139 151 A | 10/2001 |
|---|---|---|
| EP | 1 139 154 A | 10/2001 |
| EP | 1 091 237 A | 11/2001 |
| GB | 2 286 466 A | 8/1995 |
| GB | 2 330 213 A | 4/1999 |
| WO | 99/18474 A | 4/1999 |

* cited by examiner

*Primary Examiner*—Geraldina Visconti

(57) ABSTRACT

A liquid crystal device comprises a layer of a liquid crystal material contained between two spaced-apart cell walls with electrodes for applying an electric field across at least some of the liquid crystal material. At least one of the cell walls includes an alignment structure for inducing a desired local orientation of molecules of the liquid crystal material adjacent thereto. The liquid crystal material includes non-polymerisable low molecular weight surfactant molecules. The invention also provides a liquid crystal composition for use in the device and a method of manufacturing the device.

14 Claims, 3 Drawing Sheets

LIQUID CRYSTAL DEVICE, COMPOSITIONS AND METHOD OF MANUFACTURE

FIELD OF THE INVENTION

The present invention relates to liquid crystal devices, liquid crystal compositions suitable for use in the devices and method of making same.

BACKGROUND OF THE INVENTION

Liquid crystal ("LC") devices typically comprise a pair of opposed, spaced-apart cell walls with LC material between them. The cell walls have transparent electrode structures for applying electric fields to align the LC molecules. There are three main types of LC materials: nematic, cholesteric (chiral nematic) and smectic, all of which find application in different types of LC display. Many different LC display modes are known in the art. A common feature of these display modes is that each requires a surface alignment on at least one of the cell walls to provide an appropriate alignment of the LC director. Prior art display modes and methods of obtaining desired surface alignments are discussed in WO 99/18474 and EP 1 139 151. U.S. Pat. No. 3,843,233 describes an alternative to using a surface alignment structure to achieve homeotropic alignment. A surfactant dissolved in the LC acts as an "advantageous alignment agent" and promotes spontaneous homeotropic alignment.

An alignment layer may also be formed on a cell wall (substrate) by pre-coating the substrate with a surfactant such as lecithin. This coating may form the sole alignment layer, as described in U.S. Pat. No. 4,577,930, or it may modify the zenithal alignment energy of an underlying grating alignment surface as described in GB 2 286 466.

It is known from WO 99/18474 to provide an oligomer or short chain polymer either spread on the surface or within the LC material at the cell walls, to reduce anchoring energy at the surface alignment structure. Benefits include reduced operating voltage. In the examples, the oligomer or short chain polymer is formed by curing a UV-curable material such as Norland N65, or by copolymerising a mixture of dithiols and di(vinyl ethers), in a LC host.

One problem with the use of oligomers or short chain polymers in prior art devices is that the polymerisation process results in a range of molecular weights, and the anchoring properties vary with different molecular weight ranges. This can lead to difficulties in reproducing the desired properties in a manufacturing process. Moreover, further polymerisation may take place over time in a device when in use. The use of reactive monomeric species may also limit the number of available component LC materials in the host mixture because of the need to avoid using components which may react with the monomeric species.

We have now surprisingly found that the switching properties of a LC display may be improved by the addition of non-polymerisable low molecular weight surfactant molecules to the LC.

SUMMARY OF THE INVENTION

According to a first aspect of the invention there is provided a liquid crystal device comprising a layer of a liquid crystal material contained between two spaced-apart cell walls provided with electrode structures for applying an electric field across at least some of the liquid crystal material, at least one of the cell walls being provided with an alignment structure for inducing a desired local orientation of molecules of the liquid crystal material adjacent thereto; wherein the liquid crystal material includes non-polymerisable low molecular weight surfactant molecules.

Use of a non-polymerisable low molecular weight surfactant material provides improved switching characteristics which are more precisely controllable and reproducible than oligomeric or polymeric additives, and provides a simpler manufacturing process. Although some of the additives could be polymerisable in combination with other suitable functionalised monomers, such combinations are not used in the invention.

We believe that the improved switching characteristics result from a reduction in anchoring energy and/or viscosity of the liquid crystal at the surface alignment. Accordingly, another aspect of the invention provides a liquid crystal device comprising a layer of a liquid crystal material contained between two spaced-apart cell walls carrying electrode structures and a surface alignment structure on at least one wall, and means for reducing anchoring energy and/or viscosity of the liquid crystal at the surface alignment on one or both cell walls;

wherein the means for reducing anchoring energy and/or viscosity comprises non-polymerisable low molecular weight surfactant molecules in the liquid crystal material.

The term "alignment structure" is used herein to refer to any structure, coating or other treatment applied to a surface to effect a desired alignment of the local LC director. The term includes conventional surface treatments such as evaporated silcon monoxide or rubbed polyimide or PVA, and also newer alignment structures such as gratings, arrays of posts or arrays of holes.

The term "surfactant" in the context of devices in accordance with the invention is used herein to refer to a substance which is at least partially soluble in the LC and which has a portion that is preferentially attracted to the alignment structure.

The molecules preferably have a molecular weight less than about 2000. It is particularly preferred that the molecular weight is less than 1000, notably 200 to 600.

The surfactant molecules may comprise a single chemical species or a mixture of chemical species. Where there is more than one type of surfactant, it is preferred that the different surfactants do not react chemically with each other. It is of course desirable that the surfactant molecules also do not chemically react with any component of the LC material so that the LC mixture is chemically stable and non-polymerisable under normal operating conditions and during manufacture and storage.

Any suitable surfactant or surfactants may be used, for example containing thiol, ester, ether or alcohol functionality. Surfactants with thiol functionality, notably terminal thiol functionality, are particularly preferred.

Each surfactant molecule may have only one such functional group, but in a preferred embodiment the surfactant molecules are provided with more than one functional group, preferably three or four.

Two surfactants which we have found to be particularly effective are trimethylolpropane tris(3-mercaptopropionate) (TMP) and pentaerythritol tetrakis (3-mercaptopropionate) (PTMP).

The invention is applicable to many different types of LC display, for example twisted nematic, supertwisted nematic, hybrid aligned nematic, vertically aligned nematic, surface stabilised ferroelectric smectic, cholesteric phase change, dynamic scattering, and the various bistable nematic modes described in WO 99/18474 and EP 1 139 151. The alignment structure may result from a conventional alignment treatment, or to structures such as posts or holes. For convenience hereinafter the invention will be described with reference to a Post-Aligned Bistable Nematic (PABN) display of a type described in EP 1 139 151.

Without limiting the invention in any way, we theorise that the thiol groups at the end of the chains may make the materials surface specific, so that they tend to migrate to the cell surfaces, in particular to an alignment grating or post structure. We conjecture that switching may be improved by the formation of a very thin layer on top of the grating surface which disrupts the order of the LC at that interface, thereby lubricating the interactions. Lowering the order at the surface would also explain how the additives improve the uniformity of the alignment, by effectively smoothing out surface defects. We believe that the reduced order at the surface alignment structure causes a reduction in the anchoring energy and/or viscosity of the LC adjacent to the is alignment structure. Another possible mechanism is the additives may change one or more of the elastic constants of the LC.

The amount of surfactant material which is effective to improve performance of the LC display will depend on its surface specificity and how well it mixes with the LC. If the additive is strongly surface specific then the maximum concentration is lower. If the concentration is too high we have found that switching fails. The alignment becomes very mobile, as if the surface becomes too lubricated, and the states become unstable. We believe that the surfactant may effectively shield the LC from the surface anchoring, thereby preventing switching.

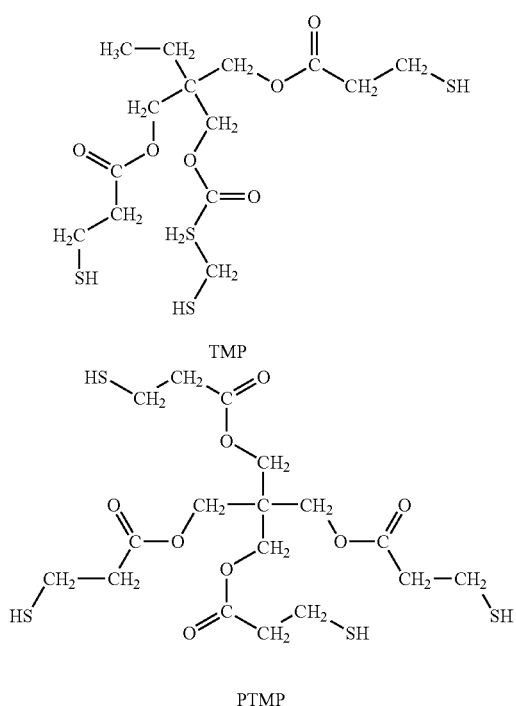

TMP

PTMP

The optimum level of additive will depend on the chemical nature of the additive, the LC mixture, the cell spacing, and the chemical nature and surface area of the surface alignment structure. If the cell spacing is narrow, the cell will have a higher surface to volume ratio. Therefore for a thin cell gap there will be a very high surface area alignment and the role of the surfactant will be more important. A generally preferred range for the surfactant additive is 0.01% to 10%, preferably 0.5% to 10%, particularly preferably 1.5% to 6% by weight of LC. For TMP, the maximum occurs at about 9%.

We think that switching failure occurs when the additive effectively screens the LC from the surface alignment layers. We have found that additives that do not mix well with the LC do not behave as useful dopants. We theorise that this is because they make the surfaces too slippery and actually inhibit switching. We have found that the most useful surfactant dopants mix well with the LC prior to filling the cell and show some surface specific nature.

According to a further aspect of the invention a bistable nematic liquid crystal device comprises:

a first cell wall and a second cell wall enclosing a layer of nematic liquid crystal material;

electrodes for applying an electric field across at least some of the liquid crystal material;

a surface alignment structure on the inner surface of at least the first cell wall for providing alignment to the liquid crystal molecules;

the surface alignment structure comprising an array of features which have a shape and/or orientation to induce a director adjacent the features to adopt two different tilt angles in substantially the same azimuthal direction; the arrangement being such that two stable liquid crystal molecular configurations can exist as a result of suitable electrical signals being applied to the electrodes, particularly after suitable electrical signals have been applied to the electrodes;

and a structure that reduces anchoring energy and/or viscosity of the liquid crystal at said surface alignment structure, said structure comprising non-polymerisable low molecular weight surfactant molecules in the liquid crystal material.

The surfactant may reduce zenithal anchoring energy, azimuthal anchoring energy, or both.

Another aspect of the invention relates to a liquid crystal composition which includes a non-polymerisable low molecular weight surfactant having thiol functionality. The LC composition may be manufactured by adding the surfactant to a conventional LC composition, which may be nematic, cholesteric or smectic.

According to a further aspect of the invention a method of manufacturing a liquid crystal display device comprises:

forming a cell having two spaced-apart cell walls including electrode structures for applying an electric field across at least some of the region between the said cell walls, at least one of the cell walls including a surface alignment structure;

filling the cell with a liquid crystal composition including non-polymerisable low molecular weight surfactant molecules that reduce anchoring energy and/or viscosity of the liquid crystal at the said surface alignment structure; and providing a fluid-tight seal around the periphery of the cell.

Apart from the presence of the surfactant in the liquid crystal, the manufacturing process may be conventional. The peripheral seal may be formed entirely after filling of the cell or, as is well known per Se, most of the periphery of the cell can be sealed and capillary filling can take place through a gap in the seal, followed by plugging the gap with sealant.

BRIEF DESCRIPTION OF THE DRAWINGS

The invention will now be further described, by way of example, with reference to the following drawings in which.

DETAILED DESCRIPTION

Figure 1:
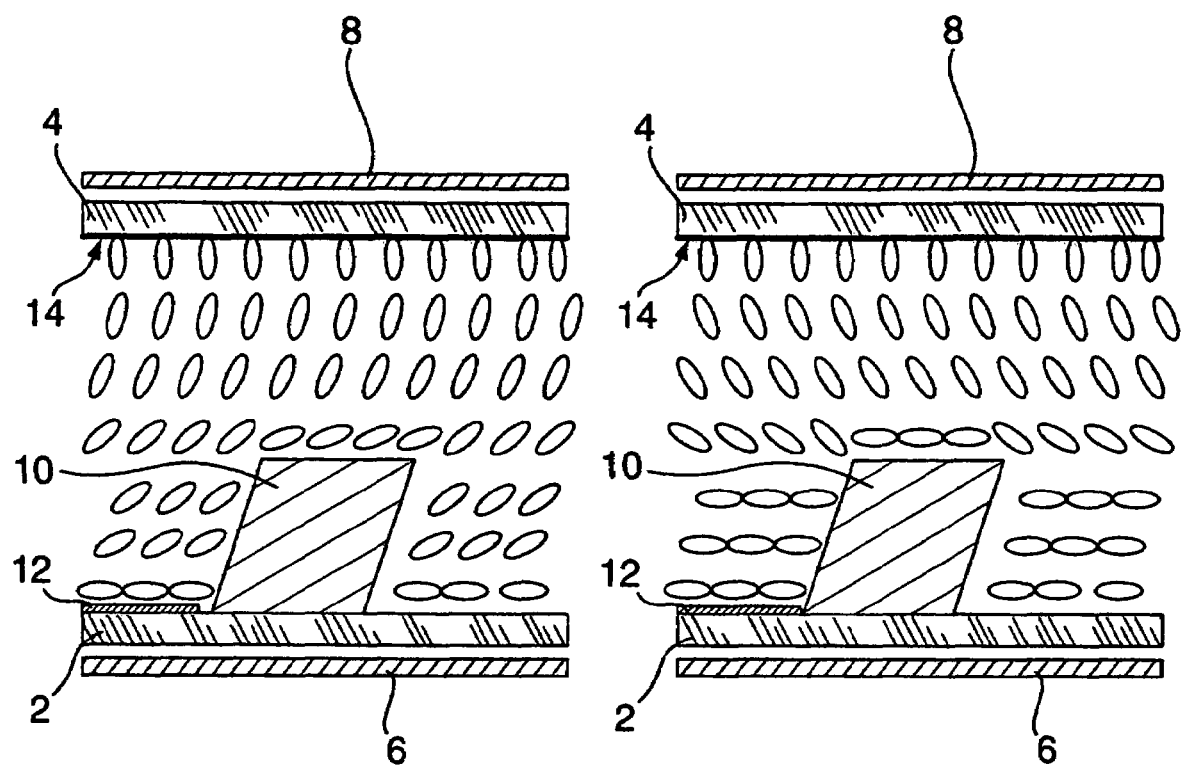
FIG. 1 includes schematic views of a cross section through a single post and the surrounding LC of a known bistable nematic device, along one of the diagonals of a post, in different states.

The bistable cell shown schematically in FIG. 1 is of a type known per se from EP 1 139 151, the content of which is incorporated herein by reference. The cell comprises a first cell wall 2 and a second cell wall 4 which enclose a layer of nematic LC material of negative dielectric anisotropy. The molecules of the LC are represented as ellipses, with the long axis indicating the local director. The inner surface of each cell wall is provided with a transparent electrode pattern, for example row electrodes 12 on the first cell wall 2 and column electrodes 14 on the second cell wall 4, in known manner.

The inner surface of the first cell wall 2 is textured with an array of square posts 10, and the inner surface of the second cell wall 4 is flat. The posts 10 are approximately 1 μm high and the cell gap is typically 3 μm. The flat surface is treated to give homeotropic alignment. The posts are not homeotropically treated.

Such an array of square posts has two preferred alignment directions in the azimuthal plane. These are along the two diagonals of the post.

By tilting the posts along one of the diagonals it is possible to favour that alignment direction. Through computer simulation of this geometry we found that although there is only one azimuthal alignment direction there are in fact two states with similar energies but which differ in how much the LC tilts. FIG. 1 is a schematic of the two states. In one state (shown on the left of FIG. 1) the LC is highly tilted, and in the other it is planar around the posts. The exact nature of the LC orientation depends on the details of the structure, but for a range of parameters there are two distinct states with different magnitudes of tilt away from the cell normal. The two states can be distinguished by viewing through a polariser 8 and an analyzer 6. The low tilt state has high birefringence and the high tilt state has low birefringence. Tilting the posts sufficiently along the diagonal also serves to eliminate reverse tilt states.

Cell Manufacture

A clean glass substrate 2 coated with Indium Tin Oxide (ITO) was taken and electrode patterns 12 were formed using conventional lithographic and wet etch procedures. The substrate was spin-coated with a suitable photoresist (Shipley S1813) to a final thickness of 1.3 μm.

A photomask (Compugraphics International PLC) with an array of suitably-dimensioned square opaque regions in a square array, was brought into hard contact with the substrate and a suitable UV source was used to expose the photoresist for 10 s at ~100 mW/cm². The substrate was developed using Microposit Developer diluted 1:1 with deionised water for approximately 20 s and rinsed dry. The substrate was flood exposed using a 365 nm UV source for 3 minutes at 30 mW/cm², and hardbaked at 85° C. for 12 hours. The substrate was then deep UV cured using a 254 nm UV source at ~50 mW/cm² for 1 hour. By exposing through the mask using a UV source at an offset angle to the normal to the plane of the cell wall, tilted posts could be produced.

A second clean ITO substrate 4 with electrode patterns 14 was taken and treated to give a homeotropic alignment of the liquid crystal. Various homeotropic alignment treatments are known in the art and are suitable for use in the present invention.

A LC test cell was formed by bringing the substrates together using suitable spacer beads (Micropearl) contained in UV curing glue (Norland Optical Adhesives N73) around the periphery of the substrates 2, 4, and cured using a 365 nm UV source. The cell was capillary filled with a nematic liquid crystal mixture (Merck ZLI 4788-000) doped with a non-polymerisable low molecular weight surfactant. Methods of spacing, assembling and filling LC cells are well known to those skilled in the art of LCD manufacture, and such conventional methods may also be used in the spacing, assembling and filling of devices in accordance with the present invention.

Experimental Results

Figure 2:
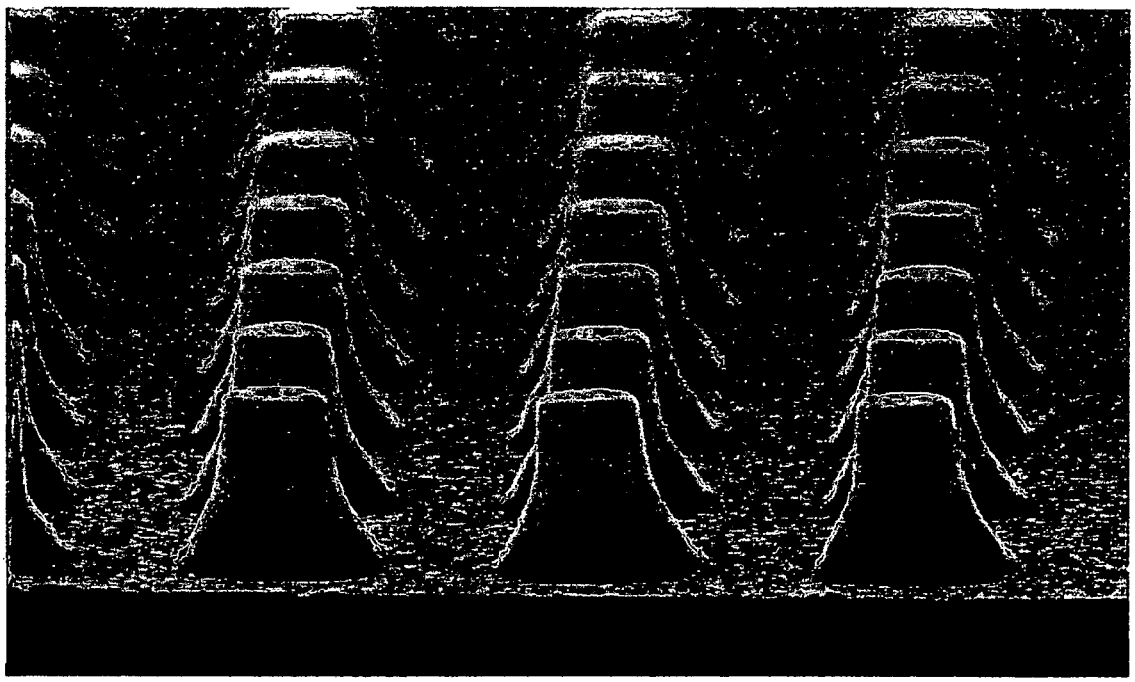
FIG. 2 is an SEM photomicrograph of an array of posts for use in the device of FIG. 1 after exposure to a conventional LC composition.
Figure 3:
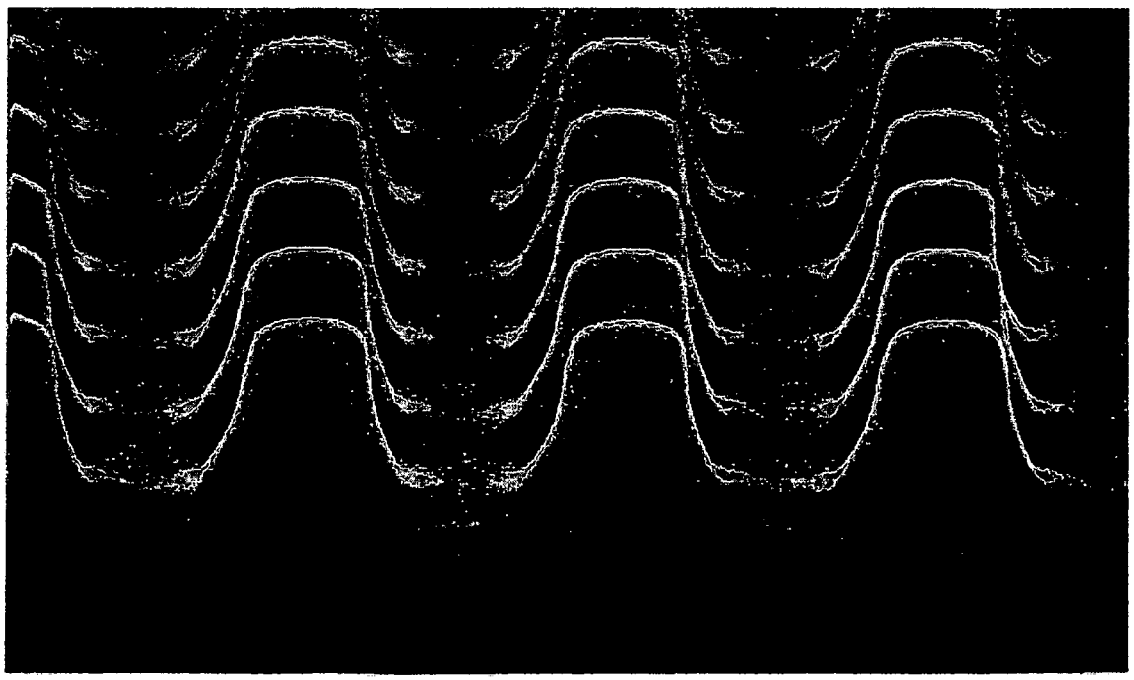
FIG. 3 is an SEM photomicrograph of a similar array of posts to those shown in FIG. 2 after exposure to a LC composition in accordance with one aspect of the invention, containing TMP.

Very small concentrations of low molecular weight surfactant were found to improve the switching, consistent with the idea that the material is surface specific. Further evidence comes from SEM pictures of grating surfaces. FIG. 2 shows a grating surface with posts about 0.8 μm high. The grating surface has been soaked in pure LC for a few days. FIG. 3 shows a similar grating soaked in a LC mixture containing 2% w/w of TMP. The grating is much more rounded and it appears that there is a layer covering the grating. This layer is much thicker than we expect to get in a real device because the volume of LC mixture used to soak the grating (a few ml) is much greater than in a device (a few μl).

The concentrations of surfactants quoted herein are theoretical values based on the weights of surfactant and LC which are mixed together. If mixing is incomplete, the effective concentration of surfactant in LC will be lower.

Switching results were recorded for various surfactants at various concentrations. The cells were switched by applying monopolar voltage pulses which have the same amplitude for each switching direction, but opposite polarity. The switching voltages recorded are the minimum amplitudes for which the cell will switch in both directions with 50 ms pulses. Three comparative results for different additives are given in Table 1.

TABLE 1

| Material | Concentration (w/w %) | Switching voltage |
|---|---|---|
| Trimethylolpropane tris (3-mercaptopropionate) | 5.4 | 15 |
| pentaerythritol tetrakis (3-mercapto-propionate) | 3.9 | 30 |
| Allyl acetate | 5 | 65 |

The results given in Table 1 were recorded at room temperature. The PABN device containing the LC without a surfactant additive will not switch at room temperature.

Results are shown in Table 1 for thiol materials and allyl acetate, which may independently be used. However allyl functional groups react with thiols so it is preferred that these additives are not mixed or present in the same LC mixture. However, such mixtures could be employed providing the additives do not react together to form a polymer or oligomer.

Figure 4:
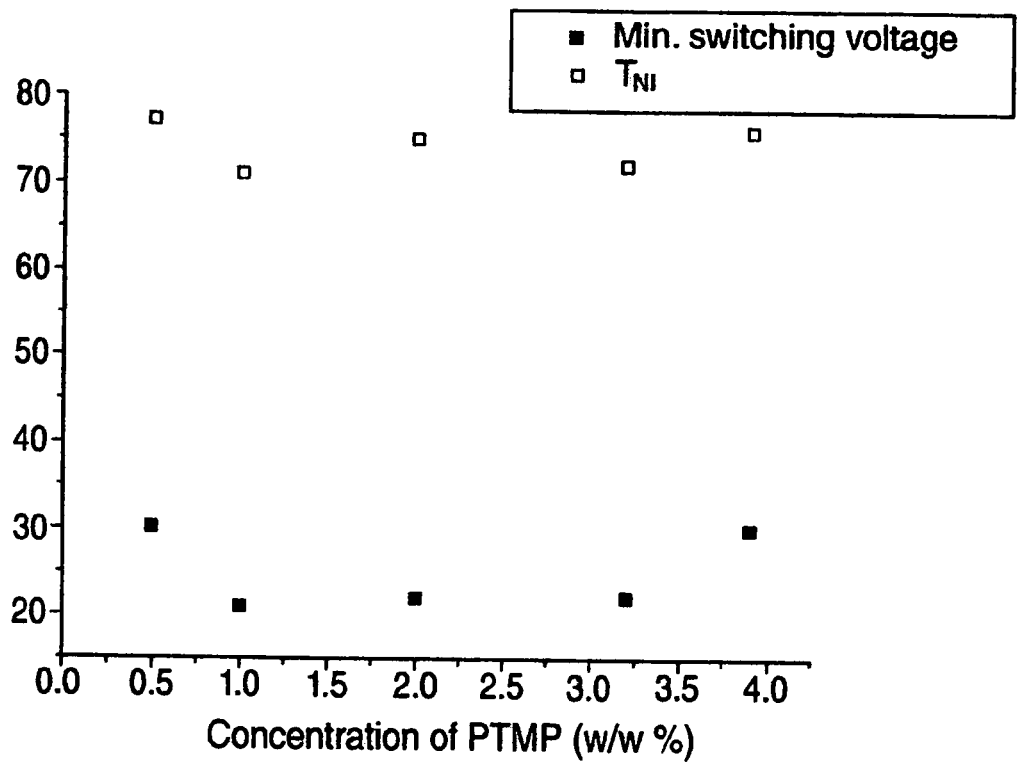
FIG. 4 is a graph of minimum switching voltages and $T_{N-I}$ for a PABN device doped with different concentrations of PTMP.
Figure 5:
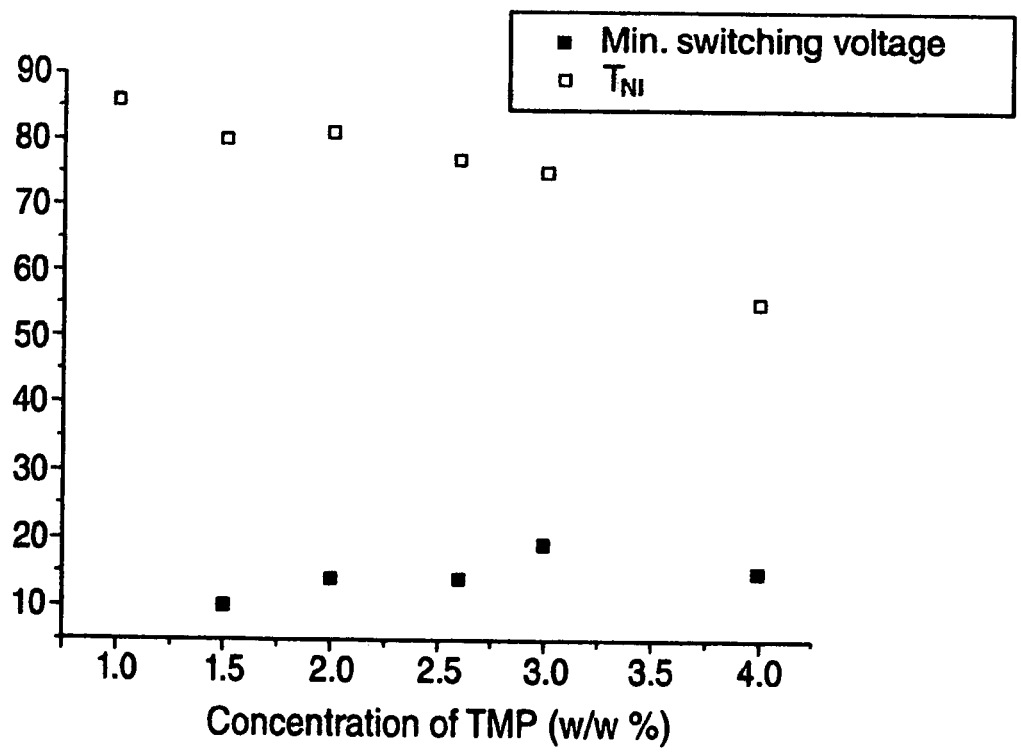
FIG. 5 is a graph of minimum switching voltages and $T_{N-I}$ for a PABN device doped with different concentrations of TMP.

Results for PABN cells containing ZLI-4788-000 doped with different concentrations of PTMP and TMP (x-axis, w/w %) are shown graphically in FIGS. 4 and 5 respectively. In both graphs, the y-axis represents voltage for the switching characteristics of the cell, and also temperature (in Celsius) for the $T_{N-I}$ (clearing temperature) values at which the LC undergoes a phase transition from nematic to isotropic liquid. The white squares plot $T_{N-I}$ and the black squares plot minimum switching voltages.

The cells can be switched at room temperature using concentrations of PTMP as low as 0.5%, and of TMP as low as 1.5%. Switching voltages of 30 V or less are required, and the doped cells have a more uniform alignment. Without dopants, no switching is observed at room temperature using voltages up to 90 V.

The features disclosed in the foregoing description or the accompanying drawings, expressed in their specific form or in terms of a means for performing the disclosed function, or a method or process for attaining the disclosed results may, separately or in any combination of such features, be used to realise the invention in various forms thereof.

While the invention has been described with reference to specific embodiments thereof it is to be understood that the invention is not limited to these embodiments. Many variations and departures from the described embodiments may be made within the scope of the invention defined by the claims.

The contents of UK Patent application No. 0127728.4, from which this application claims priority, and of the abstract accompanying this application are incorporated herein by reference.

What is claimed is:

1. A liquid crystal device comprising a layer of a liquid crystal material contained between two spaced-apart cell walls provided with electrode structures for applying an electric field across at least some of the liquid crystal material, at least one of the cell walls being provided with an alignment structure for inducing a desired local orientation of molecules of the liquid crystal material adjacent thereto;
   wherein the liquid crystal material includes non-polymerisable surfactant molecules of molecular weight less than about 2000.

2. A liquid crystal device comprising a layer of a liquid crystal material contained between two spaced-apart cell walls carrying electrode structures and a surface alignment structure on at least one wall, and a structure that reduces at least one of anchoring energy and viscosity of the liquid crystal at the surface alignment on at least one of the said cell walls;
   wherein the reducing structure comprises non-polymerisable surfactant molecules of molecular weight less than about 2000 in the liquid crystal material and are selected from a group comprising trimethylolpropane tris(3-mercaptopropionate) (TMP) and pentaerythritol tetrakis (3-mercaptopropionate) (PTMP).

3. A bistable nematic liquid crystal device comprising:
   a first cell wall and a second cell wall enclosing a layer of nematic liquid crystal material;
   electrodes for applying an electric field across at least some of the liquid crystal material;
   a surface alignment structure on an inner surface of at least the first cell wall providing alignment to the liquid crystal molecules;
   the said surface alignment structure comprising an array of features which are at least one of shaped and orientated to induce the director adjacent the features to adopt two different tilt angles in substantially the same azimuthal direction;
   the arrangement being such that two stable liquid crystal molecular configurations can exist after suitable electrical signals have been applied to the electrodes;
   and a structure that reduces at least one of anchoring energy and viscosity of the liquid crystal at the said surface alignment structure, said reducing structure comprising non-polymerisable surfactant molecules of molecular weight less than about 2000 in the liquid crystal material and are selected from a group comprising trimethylolpropane tris(3-mercaptopropionate) (TMP) and pentaerythritol tetrakis (3-mercaptopropionate) (PTMP).

4. A liquid crystal device as claimed in claim 1, wherein the said surfactant molecules have a molecular weight less than about 1000.

5. A liquid crystal device as claimed in claim 4, wherein the said surfactant molecules have a molecular weight in the range about 200 to about 600.

6. A liquid crystal device as claimed in claim 1, wherein the said surfactant molecules comprise more than one chemical species.

7. A liquid crystal device as claimed in claim 1, wherein the said surfactant molecules do not react chemically with each other or with any other component of the liquid crystal material.

8. A liquid crystal device as claimed in claim 1, wherein each surfactant molecule has at least one functional group selected from the group comprising thiol, ester, ether, alcohol.

9. A liquid crystal device as claimed in claim 1, wherein at least some of the surfactant molecules have thiol functionality.

10. A liquid crystal device as claimed in claim 1, wherein at least some of the surfactant molecules are provided with more than one functional group.

11. A liquid crystal device as claimed in claim 10, wherein at least some of the surfactant molecules are provided with three or four functional groups.

12. A liquid crystal device as claimed in claim 1, wherein the surfactant molecules are selected from the group comprising trimethylolpropane tris(3-mercaptopropionate) (TMP) and pentaerythritol tetrakis (3-mercaptopropionate) (PTMP).

13. A liquid crystal device as claimed in claim 1 wherein the said surfactant molecules comprise from about 0.5 to about 10% by weight of the liquid crystal material.

14. A liquid crystal device comprising a layer of a liquid crystal material located between two spaced-apart cell walls including electrode structures for applying an electric field across at least some of the liquid crystal material, at least one of the cell walls including an alignment structure for inducing a desired local orientation of molecules of the liquid crystal material adjacent thereto;
   the liquid crystal material including surfactant molecules selected from a group comprising of trimethylolpropane tris(3-mercaptopropionate) (TMP) and pentaerythritol tetrakis (3-mercaptopropionate) (PTMP).

* * * * *